June 19, 1951  A. S. THOMPSON  2,557,898
GAS TURBINE DIAPHRAGM
Filed Nov. 3, 1947
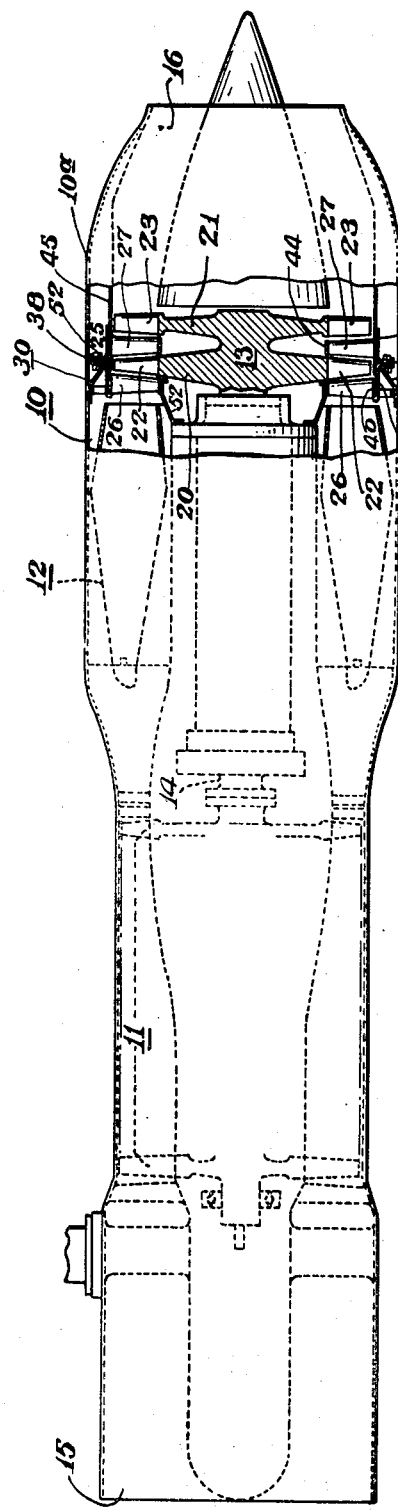
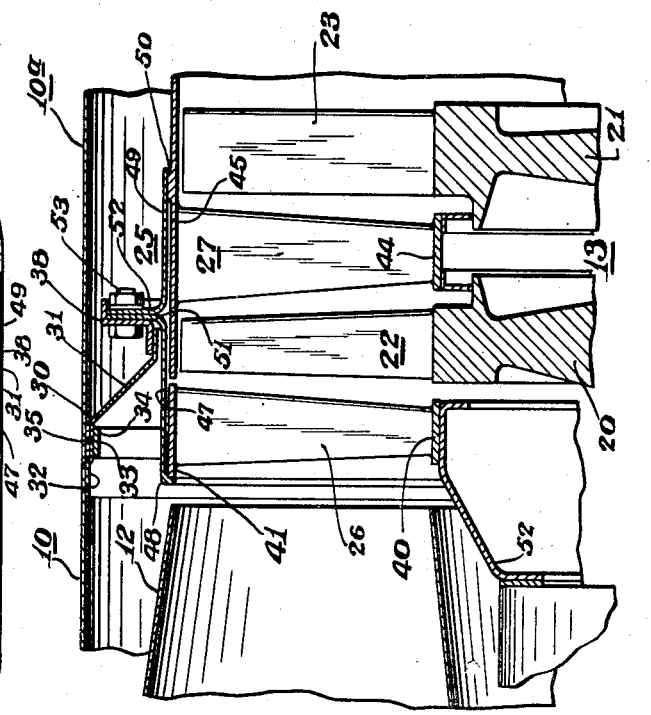
Fig.1.
Fig.2.
INVENTOR
Albert S. Thompson
BY
ATTORNEY Patented June 19, 1951

2,557,898

UNITED STATES PATENT OFFICE 2,557,898

GAS TURBINE DIAPHRAGM

Albert S. Thompson, Los Angeles, Calif., assignor, by mesne assignments, to the United States of America as represented by the Secretary of the Navy Application November 3, 1947, Serial No. 783,728

1 Claim. (Cl. 253—39)

This invention relates to gas turbine power plants, and more particularly to a turbine diaphragm construction for a gas turbine power plant of the type employed in aircraft.

In the operation of a gas turbine apparatus of the class designed for use in propelling aircraft, rapid variations in temperature are frequently encountered, and normal maximum temperatures of heated motive fluid passing through the turbine are extremely high, ranging between about 1300° F. and 1400° F. It is consequently desirable to provide the gas turbine with means operative to compensate for expansion of parts due to such extreme temperature variations, while maintaining proper clearances to insure maximum efficiency in operation. The elements of the diaphragm structure of a gas turbine are particularly apt to warp or otherwise respond unfavorably to temperature variations, unless so devised as to permit the necessary uniform expansion of parts directly effected by the heat of motive fluid, without imparting excessive strain to the power plant structure as a whole.

It is an object of my invention to provide an improved diaphragm assembly for a gas turbine power plant having features of construction overcoming the aforesaid difficulties.

Another object of the invention is to provide an improved diaphragm structure for a gas turbine apparatus and means for yieldably supporting the diaphragm structure, the various elements of which may be readily assembled to insure accurate positioning of relatively movable parts.

Still another object of the invention is to provide an improved diaphragm structure including elements which may be assembled and secured together prior to machining of the associated turbine bearing member, thereby insuring accurate alignment of the bearing and related operating elements.

Other objects and advantages of the invention will be apparent in the following more detailed description thereof, taken in connection with the accompanying drawing, forming a part of this application, in which:

Fig. 1 is a schematic view, partly in section, of a gas turbine power plant embodying features of the invention; and Fig. 2 is an enlarged-detail sectional view of a portion of the apparatus shown in Fig. 1.

As shown in Fig. 1, the invention may be utilized in a gas turbine power plant of a type successfully employed for propelling aircraft and comprising a generally cylindrical outer casing structure 10 having operatively mounted therein an axial-flow compressor, indicated generally by the reference character 11, combustion apparatus 12, and a turbine indicated generally at 13, the turbine and compressor being operatively connected through the medium of a common shaft 14. The shaft 14 is journaled in suitable bearings supported in a centrally disposed core structure carried within the casing structure 10. The principle of operation of a gas turbine apparatus of this type is well understood and may briefly be stated as follows: air enters the intake 15 at the forward end of the casing structure 10 and is compressed by operation of the compressor 11, after which the temperature of the air under pressure is raised during its passage through the combustion apparatus 12. The hot compressed air and products of combustion are then discharged from the combustion apparatus and are allowed to expand through the turbine 13, and then are expelled rearwardly by way of a nozzle 16 to provide a propulsive force.

It will thus be seen that the turbine 13 is required to operate in a zone wherein maximum temperatures of the heated motive fluid delivered from the combustion apparatus are encountered. In the form of the apparatus illustrated in the drawing, a two-stage turbine is provided, comprising an assembled pair of turbine discs 20 and 21 which are mounted on the shaft 14 and are each adapted to carry a plurality of radially disposed turbine blades 22 and 23, respectively. Associated with the rotary turbine blades 22 and 23 is a diaphragm structure 25, which comprises two stages of nozzle or stator blades 26 and 27 which are so constructed and arranged, as hereinafter described, as to direct heated motive fluid flowing from the combustion apparatus 12 against the turbine blades 22 and 23.

According to the invention, best shown in Fig. 2 of the drawing, an annular diaphragm carrier member 30 having a frusto-conical flange portion 31 is mounted within the cylindrical casing structure 10. Formed on the carrier member 30 is a cylindrical portion 32, which may be spot welded to the inner wall of the casing structure 10, and an inwardly offset portion 33 which is adapted to be interposed between rings 34 and 35 to provide sufficient body for receiving suitable screws (not shown) fastening a tail-piece section 10a to the casing structure. To a suitably formed edge of the inclined flange 31 is welded a flanged ring 38 having a body portion disposed substantially normal to the axis of the turbine 13.

Associated with the nozzle blades 26 are an inner shroud member or ring 40 and an outer shroud member or ring 41, both of which may be provided with suitable slots (not shown) for receiving and holding the ends of the respective blades. The nozzle blades 27 are similarly mounted between an inner shroud ring 44 and an outer cylindrical shroud member 45, the shroud member 45 being of sufficient length to overlap the adjacent ends of the blades 27.

For securing the respective outer shroud members 41 and 45 in place, there are provided a cylindrical support member 47 having an inwardly bent marginal portion 48 engageable with one end of the shroud member 41, and a cylindrical support member 49 having a marginal portion adapted to be welded or otherwise suitably secured to an annular elevated portion 50 formed on the shroud member 45. Outwardly extending flanges 51 and 52 are formed on the respective support members 47 and 49, and when disposed in abutting relation, as shown in Fig. 2, are adapted to be secured to the flanged ring 38 by means of a plurality of bolts 53. Suitable registering apertures are of course formed in the flanged ring 38 and in the flanges 51 and 52 for receiving these bolts, which are disposed parallel to the axis of the turbine 13 as indicated in Fig. 2.

It will be noted that the marginal portion 48 of the cylindrical support member 47 is provided with a shoulder by means of which the shroud member 41 is maintained in spaced relation to the adjacent surface of the support member. In a similar manner, the adjacent surfaces of the support member 49 and the shroud member 45 are separated due to the provision of the elevated portion 50 formed on the shroud member. It will thus be seen that substantial portions of both annular shroud members 41 and 45 are held out of thermal contact with adjacent surfaces of the respective support members 47 and 49, although adequate support and accurate alignment of the associated nozzle vanes will nevertheless be insured. A suitable bearing support means 52 if desired may be secured to the shroud ring 40 and machined prior to installation of the diaphragm assembly in the casing structure 10.

From the foregoing, it will be seen that the novel diaphragm assembly constructed in accordance with the invention comprises a desirably small number of sturdy and relatively simple elements, which can be accurately assembled to provide a circular unit insuring uniform resistance to any tendency of the structure to warp, such as might result in the case of nonuniform members when subjected to the high operating temperatures normally encountered in service.

According to the invention, the assembled elements of diaphragm structure including the outer shroud rings are devised to permit free expansion outwardly, due to the support afforded by the relatively flexible support members 47 and 49 and the associated carrier flange 31. The inner shroud rings are relatively rigid, however, and are adapted to aid in resisting undesirable deformation of the diaphragm assembly. By reason of the fact that the various elements of the diaphragm structure can be assembled and welded together prior to installation within the casing structure 10, accurate machining of the turbine bearing supporting means carried thereby may be conveniently accomplished in a manner insuring the desired accurate alignment of the operating parts of the apparatus.

While the invention has been shown in but one form, it will be obvious to those skilled in the art that it is not so limited, but is susceptible of various changes and modifications without departing from the spirit thereof.

What is claimed is:

In a gas turbine power plant including a substantially cylindrical casing structure, means therein for supplying heated motive fluid under pressure, and a turbine operative by such heated motive fluid, the combination therewith of a uniform circular diaphragm structure for said turbine comprising two stages of nozzle blades, inner and outer shroud rings for the respective stages of blades, an annular carrier member mounted in said casing structure and having an inwardly inclined flange, a pair of cylindrical support members having abutting flanges adapted to be bolted to said inclined flange of the carrier member, and annular contact surfaces formed on each of said outer shroud rings adapted to engage only the marginal portions of said support members, whereby relatively large areas of said support members are maintained in spaced surrounding relation with respect to said shroud rings for permitting free and uniform outward expansion thereof.

ALBERT S. THOMPSON.

REFERENCES CITED

The following references are of record in the file of this patent:

UNITED STATES PATENTS

| Number | Name | Date |
|---|---|---|
| 1,666,626 | Losel | Apr. 17, 1928 |
| 2,445,661 | Constant et al. | July 20, 1948 |